United States Patent [19]

Kimura

[11] Patent Number: 4,598,002
[45] Date of Patent: Jul. 1, 1986

[54] CORE BAR OF STEERING WHEEL

[75] Inventor: Saburo Kimura, Toyota, Japan

[73] Assignee: Toyoda Gosei Co., Ltd., Nishikasugai, Japan

[21] Appl. No.: 604,961

[22] Filed: Apr. 27, 1984

[30] Foreign Application Priority Data

May 2, 1983 [JP] Japan .............................. 58-66501[U]
May 2, 1983 [JP] Japan .............................. 58-66502[U]

[51] Int. Cl.[4] .............................................. B62D 1/04
[52] U.S. Cl. .................................... 428/36; 428/591; 74/552
[58] Field of Search ................. 428/36, 591; 138/145; 74/552

[56] References Cited

U.S. PATENT DOCUMENTS

| 2,827,801 | 3/1958 | Ingolia | 74/552 |
| 3,398,601 | 8/1968 | Schroeder | 74/552 |
| 3,583,255 | 6/1971 | Curcuru | 74/552 |
| 4,118,455 | 10/1978 | Byrn | 74/552 |

FOREIGN PATENT DOCUMENTS 56-48502 3/1980 Japan.
57-74872 5/1982 Japan.

Primary Examiner—John Kittle
Assistant Examiner—James J. Seidleck
Attorney, Agent, or Firm—Cushman, Darby & Cushman

[57] ABSTRACT

The present invention relates to the core bar of steering wheels. The core bar comprises a ring part formed into a hollow pipe-shaped form having a hollow part using at least one metal plate; a coating layer made of a synthetic resin covering the entire surface of the ring part; and a regulating means installed on the ring part to prevent the movement of the coating layer on the ring part in the direction of the periphery of the cross section of the ring part. The ring part has reinforcing fillers packed into its hollow part.

9 Claims, 16 Drawing Figures

CORE BAR OF STEERING WHEEL

BACKGROUND OF THE INVENTION

1. FIELD OF THE INVENTION

The present invention relates to the core bar of steering wheels.

2. DESCRIPTION OF THE PRIOR ART

In core bars of conventional steering wheels for automobiles, almost all peripheral shapes of sections of the ring part are round, so that coating layers of polyurethane or the like applied on the periphery of the ring part are apt to move in the direction of sectional periphery of the ring part. For prevention of the movement, as adhesive is applied on the ring part. Therefore, construction of steering wheels requires a process for applying of an adhesive and further, quality control of adhesives is necessary. The above-mentioned conditions are the same both with hollow pipe-shaped core bars and with solid core bars.

Further, in some solid core bars, the ring part having a round section was worked into an odd-shaped ring part having e.g. a half-round section for the purpose of preventing the movement of a coating layer. The working, however, required large-scale working processes and devices, leading to an increase in manufacturing cost.

Conventional hollow core bars for steering wheels had a considerble large wall thickness of the ring part, which was about 1.6 mm for the core bar made of steel.

When the wall thickness of the ring part was further lessened to reduce its weight, there were possibilities of the ring part being crushed by an injection pressure in coating the part with a synthetic resin such as a polypropylene resin or a polyvinyl chloride resin by an injection molding method, so that it was difficult to realize such lessening of the wall thickness.

OBJECT OF THE INVENTION

The object of the present invention is to provide the core bar of steering wheels which not only can be manufactured easily and formed into a lightweight core bar but also has been worked so as to prevent certainly the movement of the coating layer of steering wheels in the direction of periphery of the cross section without the use of an adhesive.

The additional object of the present invention is to provide the core bar of steering wheels which can be formed into a lightweight core bar by lessening the wall thickness without possibilities of deformation due to an injection pressure in injection-molding the coating layer of steering wheels.

The further additional object of the present invention is to provide the core bar of steering wheels which has been filled with light reinforcing fillers with nearly no increase in the weight of the whole steering wheel.

Other and further objects of the present invention will become obvious upon an understanding of the illustrative embodiments about to be described or will be indicated in the appended claims, and various advantages not refferred to herein will occur to one skilled in the art upon employment of the present invention in practice.

Figures from FIG. 3(a) to FIG. 3(k) are all cross sectional views showing other examples of the ring part of the core bar.

Figure 4:
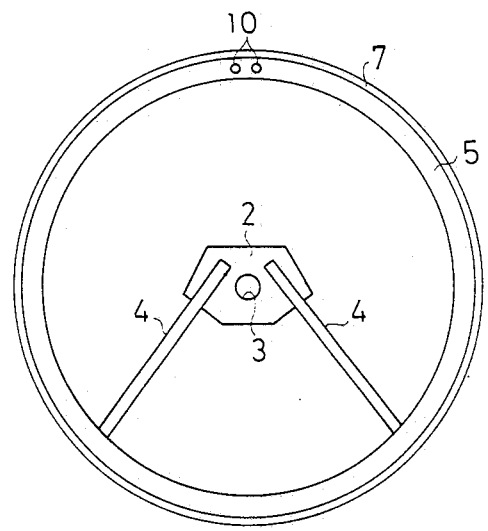

FIG. 4 is a front view of the core bar into the hollow part of which reinforcing fillers have been injected.

Figure 5:
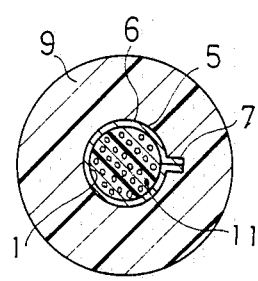

FIG. 5 is an enlarged sectional view showing a state in which the coating layer is installed on the core bar.

Figure 6:
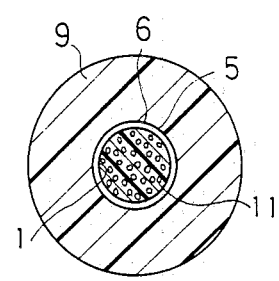

FIG. 6 is a sectional view showing another example of the core bar of FIGS. 4 and 5.

DETAILED DESCRIPTION OF THE PREFERRED EMBODIMENTS

Figure 1:
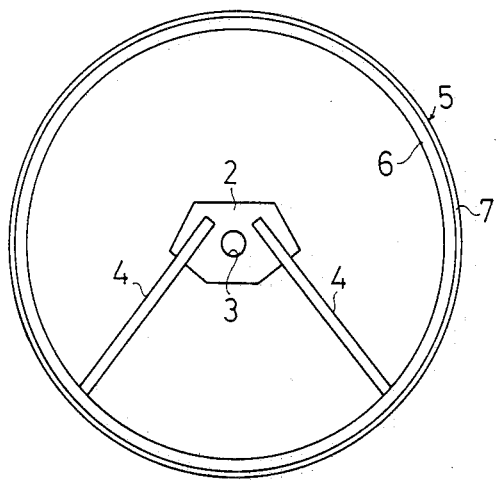
FIG. 1 is a front view showing one example of the core bar of steering wheels which embodies the present invention.

An example embodying the present invention is described below on the basis of FIGS. 1 and 2.

A number 2 shows a boss part of the core bar, and the boss part comprises a metal plate and is provided with a central tapered hole 3 through which it is attached to the steering shaft (not shown in the figure). A number 4 shows a spoke part of the core bar, and the spoke part, which comprises a metal plate, extends in the radial direction with its base end fixed to the boss part 2. A number 5 shows the ring part of the core bar, which ring part is fixed to the tips of spoke parts 4 by welding. In the ring part, a hollow ring pipe having a hollow part 1 of nearly round section is formed by the bending working of a metal plate 6 and, at the same time, the both edge parts to be joined with each other of the metal plate 6 are bent outward to be laid one over the other and then are welded, thus forming an obstructing protrusion 7 as a regulating means.

The ring part 5 has a certain extent of wall thickness not to be deformed by an injection pressure when it is coated with a coating layer 9 on its surface by an injection molding method.

Figure 2:
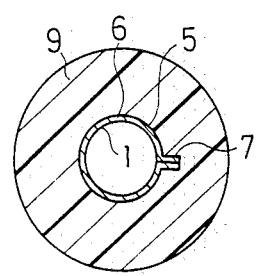
FIG. 2 is an enlarged sectional view showing a state in which the coating layer is installed on the core bar of FIG. 1.

With the core bar of steering wheels which has been constituted as mentioned above, even if the ring part 5 on which an adhesive has not been applied as shown in FIG. 2 is directly coated with a coating layer 9 comprising a synthetic resin such as polyurethane, the coating layer 9 by no means moves on the ring part 5 because its movement is obstructed by the above-mentioned obstructing protrusion 7. In addition, in injection molding of the coating layer 9, the resin of coating layer 9 does not enter the hollow part 1 of the ring part 5. As the hollow ring part 5 is formed using a metal plate 6, the ring part 5 is of low cost and lightweight and also the obstructing protrusion 7 can be formed easily at the same time the ring part 5 is formed.

Next, other examples of the present invention are described based on figures from FIG. 3(a) to FIG. 3(k). These examples are different from the above-mentioned example of FIG. 2 in the structure of ring part 5.

Figure 3A:
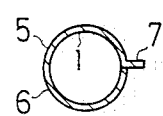
Figure 3B:
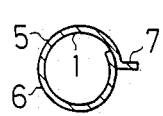
Figure 3C:
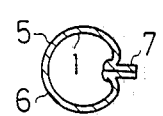
Figure 3D:
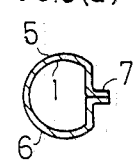
Figure 3E:
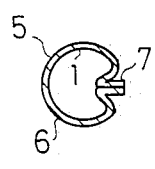
Figure 3F:
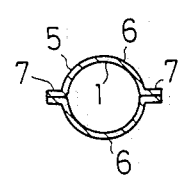
Figure 3G:
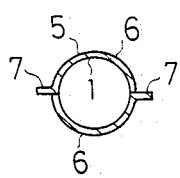
Figure 3H:
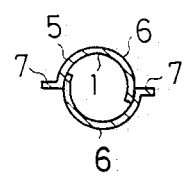
Figure 3I:
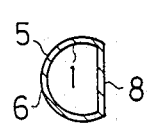
Figure 3J:
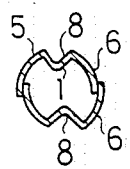
Figure 3K:
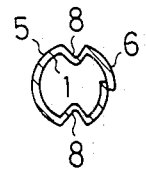

In FIGS. 3(a) and 3(b), the one edge part of one metal plate 6 is bent outward to form the obstructing protrusion 7. In FIG. 3(c), the joint part of the above-mentioned example of FIG. 2 is forced somewhat into the inside of the ring part 5. In FIGS. 3(d) and 3(e), the tip of the same joint part is accommodated within the sectional circle of the hollow part 1. In FIGS. 3(f), 3(g) and 3(h), two metal plates 6 are each worked into a form having a nearly half-round arc-shaped section and then they are combined with each other. In FIG. 3(f), the both edge parts of each metal plate 6 are each bent outward to form two obstructing protrusions 7. In FIGS. 3(g) and 3(h), the one edge part of each of two metal plates 6 is bent outward to form two obstructing protrusions 7. In FIG. 3(i), one metal plate 6 is worked into a hollow pipe-shaped form having such a sectional shape as a part of the sectional circle has been recessed inward to form an obstructing recession 8. In FIG. 3(j), two metal plates 6 are combined to work them into a hollow pipe-shaped form and on each of them, a longitudinal obstructing recession 8 is formed. In FIG. 3(k), one metal plate 6 is worked into a hollow pipe-shaped form, on which two longitudinal obstructing recessions 8 are formed. All the above-mentioned examples in figures from FIG. 3(a) to FIG. 3(k) have the same effect as the above-mentioned example of FIG. 2 has.

Further, in examples of FIGS. 3(f), 3(g), 3(h) and 3(j), the joint part of the two metal plates 6 need be welded, but in the above-mentioned examples other than these four ones and in the above-mentioned example of FIG. 2 the joint part of ring part need not always be welded.

The present invention is not limited to the constitution of the above-mentioned example of FIG. 2 and of the above-mentioned examples of FIGS. 3(a) to 3(k). For example, the shape of ring part 5 may be any one if it can prevent the movement of the coating layer 9. Further, an auxiliary adhesive may be used between the ring part 5 and the coating layer 9.

Next, a further different example of the present invention is described based on FIGS. 4 and 5. In this example, the structure of the core bar is nearly the same as that in the above-mentioned FIGS. 1 and 2. The ring part 5 of the core bar of this example comprises a hollow steel pipe-shaped material of a relatively thin wall thickness of 0.4–1.6 mm. A number 10 shows injecting openings for fillers which are installed at the top part of the ring part 5. A number 11 shows reinforcing fillers which have been injected in a viscous liquid state into the inside of the hollow part 1 of the ring part 5 through the injecting openings 10 and then have been solidified after being packed, and as the raw material of the reinforcing fillers, a low-specific gravity mixture in which a polyester resin is blended with sawdust or the like is used.

With the thus constituted core bar of steering wheels, even if the ring part 5 has the above-mentioned thin wall thickness, it is reinforced and supported by the reinforcing fillers 11 packed into its inside, so that the ring part 5 will not be deformed by an injection pressure when a coating layer 9 of a polypropylene resin or the like is formed on the periphery of the ring part 5 by injection molding, as shown in FIG. 5. In addition, the reinforcing material 11 is of such a low-specific gravity that an increase in the weight of steering wheel hardly comes into guestion. Further, since the top part of the ring part 5 is a part which is seldom subjected to external forces, a lowering in the strength of the top part due to the above-mentioned injecting openings 10 is also out of the question.

Further, the ring part 5 may take a form without the obstructing protrusion 7, as shown in FIG. 6.

The above-mentioned different example based on FIGS. 4, 5 and 6 has also the same effect on the above-mentioned examples have.

Further, as the reinforcing fillers 11, there may be used inorganic materials such as gypsum and light-weight concrete and synthetic resins such as epoxy resins, hard urethane resins and liquid polyamide resins, foams of these synthetic resins or these synthetic resins blended with organic materials such as chaff, fiber flocks and waste paper or with various kinds of hollow bodies such as Shirasu (volcanic ash) balloons and glass balloons.

As mentioned above in detail, the core bar of steering wheels made in accordance with the present invention not only can be manufactured easily and can be formed into a light weight article, but also it can prevent the movement of the coating layer on it in the direction of the periphery of its cross section when it is coated with a synthetic resin in a state where it has just been formed. Therefore, application of an adhesive on the ring part can be omitted, and thus, the core bar has an excellent effect of a decrease in manufacturing cost.

In addition, when the coating layer on the ring part is formed by injection molding, the ring part is by no means deformed by the injection pressure. Therefore, the core bar has also an effect of making it possible to lessen the wall thickness of the ring part for attempting to make the ring part more lightweight.

As many apparently widely different embodiments of this invention may be made without departing from the spirit and scope thereof, it is to be understood that the invention is not limited to the specific embodiments thereof except as defined in the appended claims.

What is claimed is:

1. A core member of a steering wheel, comprising:
   a ring portion formed into a hollow pipe-shaped form by bending at least one metal plate;
   at least one regulating means formed from said ring portion for preventing a coating layer on said ring portion from rotating around said ring portion, said regulating means being at least one of (A) as obstructing protrusion which is at least one edge part of said metal plate and (B) a recession formed on a surface of said ring portion in contact with said layer;
   a boss portion; and
   at least one spoke portion connecting said ring portion and said boss portion.

2. The core member as in claim 1, wherein the ring part is formed by bending one metal plate and the regulating means is an obstructing protrusion which is at least the one edge part of the bent plate metal and protrudes toward at least the outside of the ring part.

3. The core member as in claim 1, wherein the obstructing protrusion is a joint part in which the both edge parts of the metal plate are joined with each other.

4. The core member as in claim 1, wherein the ring part is formed by bending two metal plates and then by combining them with each other and the regulating means is a pair of obstructing protrusions protruding from each metal plate toward both the inside and outside of the ring part.

5. The core member as in claim 1, wherein the regulating means is an obstructing recession formed by recessing a part of the surface of the metal plate toward the inside of the hollow part.

6. The core member as in claim 5, wherein the obstructing recession is formed by recessing two longitutinally continuous, separate places on the surface of the metal plate.

7. The core member as in claim 1, wherein the ring part has reinforcing fillers packed and solidified in its hollow part.

8. The core member as in claim 7, wherein the reinforcing fillers are low-specific gravity ones formed by blending a polyester resin with sawdust.

9. The core member as in claim 7, wherein the ring part is formed by bending one metal plate and the regulating means is an obstructing protrusion which is the both edge parts of the metal plate and protrudes toward the outside of the ring part to engage with the coating layer.

* * * * *